United States Patent
Sadowski et al.

(10) Patent No.: US 9,605,702 B2
(45) Date of Patent: Mar. 28, 2017

(54) SYSTEM FOR LOCKING A COUPLING OF ELEMENTS, HAVING MALE AND FEMALE ENDS

(71) Applicants: COLLIN, Bagneux (FR); Boguslaw Sadowski, Le Raincy (FR)

(72) Inventors: Boguslaw Sadowski, Le Raincy (FR); Mathieu Miroir, Massy (FR)

(73) Assignees: COLLIN, Bagneux (FR); BOGUSLAW SADOWSKI, Le Raincy (FR)

( * ) Notice: Subject to any disclaimer, the term of this patent is extended or adjusted under 35 U.S.C. 154(b) by 0 days.

(21) Appl. No.: 14/646,755

(22) PCT Filed: Nov. 18, 2013

(86) PCT No.: PCT/FR2013/052769
§ 371 (c)(1),
(2) Date: May 22, 2015

(87) PCT Pub. No.: WO2014/080113
PCT Pub. Date: May 30, 2014

(65) Prior Publication Data
US 2015/0300391 A1    Oct. 22, 2015

(30) Foreign Application Priority Data

Nov. 22, 2012  (FR) ..................... 12 61145

(51) Int. Cl.
*F16B 7/04* (2006.01)
*F16L 21/00* (2006.01)
*F16L 37/10* (2006.01)

(52) U.S. Cl.
CPC ............ *F16B 7/042* (2013.01); *F16L 21/002* (2013.01); *F16L 37/101* (2013.01)

(58) Field of Classification Search
CPC .... F16B 7/042; F16B 21/165; Y10T 403/592; F16D 1/116; F16L 21/002; F16L 37/101
See application file for complete search history.

(56) References Cited

U.S. PATENT DOCUMENTS

| | | | |
|---|---|---|---|
| 3,480,310 A | 11/1969 | McElwain | |
| 2003/0143021 A1* | 7/2003 | Whalen | F16H 59/0278 403/322.2 |

(Continued)

FOREIGN PATENT DOCUMENTS

| | | |
|---|---|---|
| FR | 2707432 B1 | 1/1995 |
| FR | 2786847 A1 | 6/2000 |
| GB | 2021722 A | 10/1979 |

OTHER PUBLICATIONS

International Search Report, dated Feb. 27, 2014, from corresponding PCT application.

*Primary Examiner* — Daniel P Stodola
*Assistant Examiner* — Jonathan Masinick
(74) *Attorney, Agent, or Firm* — Young & Thompson

(57) ABSTRACT

This locking system includes a male cylindrical end and a female tubular cylindrical end inside of which the male cylindrical end is to be inserted for coupling. A locking groove is hollowed in the outer surface of the male cylindrical end. The female tubular cylindrical end is bored on the side with a through-opening inside of which is arranged a mobile locking element which protrudes inside the female tubular cylindrical end in the locking groove of the male cylindrical end. A locking ring is mounted to rotate freely on the outer surface of the female tubular cylindrical end opposite the through-opening this ring having an inner surface wherein a recess having an ortho-radially variable depth enables the locking/unlocking of the mobile locking element against the locking groove depending on the ring's (Continued)

position. The locking groove extends in the axial direction of the male cylindrical end from a free end thereof.

12 Claims, 1 Drawing Sheet

(56) References Cited

U.S. PATENT DOCUMENTS

| | | | | |
|---|---|---|---|---|
| 2004/0089116 | A1* | 5/2004 | Cheng | B25B 23/0021 |
| | | | | 81/177.85 |
| 2005/0163559 | A1* | 7/2005 | Chang | F16B 7/042 |
| | | | | 403/109.3 |
| 2009/0322041 | A1* | 12/2009 | Norton | B25J 15/04 |
| | | | | 279/2.11 |
| 2012/0252646 | A1* | 10/2012 | Norton | B23B 31/1071 |
| | | | | 483/16 |
| 2014/0079475 | A1* | 3/2014 | O'Neill | B23Q 3/103 |
| | | | | 403/299 |
| 2014/0270926 | A1* | 9/2014 | Norton | F16D 41/086 |
| | | | | 403/322.2 |

* cited by examiner

AA'

SYSTEM FOR LOCKING A COUPLING OF ELEMENTS, HAVING MALE AND FEMALE ENDS

BACKGROUND OF THE INVENTION

This invention relates to a locking system comprising a male cylindrical end of a first element and a female tubular cylindrical end of a second element, the male cylindrical end being intended to be engaged inside the female tubular cylindrical end to couple the first element to the second element.

Many locking systems exist for coupling and locking two mechanical elements such as a tool and a tool holder, the tool and its tool holder being with corresponding cylindrical male (in general for the tool) and female (in general for the tool holder) ends. The tool can be for example a cutting or sharp tool, a screwdriver, a mechanical key, a drill, a tap, etc. The locking system used is then for example with a mandrel, tightening screw, clamp, using a system for tightening with or without a return spring. It generally has a certain complexity, in particular in terms of ergonomics and usage, requiring the two hands of a user and sometimes the use of a screwdriver or specific locking keys.

Many locking systems also exist for coupling and locking two mechanical elements such as coaxial cables or ducts of which the ends are also of corresponding male and female shapes. They also generally have a certain complexity and must further provide a good seal (fluidic transmission ducts) or a good connection (electrical cables). These seal and connection constraints can also apply to certain precision tools, in the medical field for example. They participate in the complexity of the locking.

It is desirable despite everything, in particular in precision applications, to simplify the ergonomics of the lock. The invention then applies more particularly to a locking system of the aforementioned type, wherein:
  a locking groove is hollowed in the outer surface of the male cylindrical end,
  the female tubular cylindrical end is bored on the side with a through-opening inside of which is arranged a mobile locking element able to protrude inside the female tubular cylindrical end in the locking groove of the male cylindrical end, and
  a locking ring is mounted on the outer surface of the female tubular cylindrical end opposite the through-opening, with this ring having an inner surface wherein a recess with variable depth enables the locking/unlocking of the mobile locking element against the locking groove depending on the position of the ring.

Such a locking system is for example described in the French patent published as number FR 2 707 432 B1. In this document, an annular locking groove is hollowed in the outer surface of the male cylindrical end. The mobile locking element is a ball and, according to the axial position of the locking ring along the female tubular cylindrical end, the inner surface of the locking ring being itself also provided with one or several annular grooves, the ball is compressed and blocked against the locking annular groove or unblocked. More precisely, the ball is blocked against the locking groove of the male cylindrical end when the latter is arranged opposite the through-opening and when the ball is not opposite one of the annular grooves of the female tubular cylindrical end; on the contrary, the ball is unblocked with a certain degree of freedom when it is opposite one of the annular grooves of the female tubular cylindrical end.

The ergonomics of this locking system is improved as compared to the other existing systems, but the system remains complex, in particular because it requires providing return means and also because certain actions of locking or unlocking, according to the embodiment chosen, can require axial movements in opposite directions to be carried out at the same time wherein the two hands of a user must then be solicited.

SUMMARY OF THE INVENTION

It can then be desired to provide a locking system which makes it possible to overcome at least some of the aforementioned problems and constraints.

A locking system is therefore proposed comprising a male cylindrical end of a first element and a female tubular cylindrical end of a second element, the male cylindrical end being intended to be engaged inside the female tubular cylindrical end for coupling the first element to the second element, wherein:
  a locking groove is hollowed in the outer surface of the male cylindrical end,
  the female tubular cylindrical end is bored on the side with a through-opening inside of which is arranged a mobile locking element able to protrude inside the female tubular cylindrical end in the locking groove of the male cylindrical end, and
  a locking ring is mounted on the outer surface of the female tubular cylindrical end opposite the through-opening, with this ring having an inner surface wherein a recess with variable depth enables the locking/unlocking of the mobile locking element against the locking groove depending on the position of the ring,
and wherein the locking ring is mounted to rotate freely around the female tubular cylindrical end and in that the variability of the depth of the recess allowing the locking/unlocking of the mobile locking element is ortho-radial.

Advantageously, the locking groove extends in the axial direction of the male cylindrical end from a free end thereof, in order to guide and angularly limit the insertion of the male cylindrical end in the female tubular cylindrical end.

As such, thanks to the invention, it is through a movement of ortho-radial rotation blocking and unblocking the mobile locking element that the ring allows the locking and the unlocking of the coupling guided angularly. As this movement of rotation can be carried out easily using two fingers of the same hand, the thumb and the index, said hand itself able to maintain the female tubular cylindrical end using the other fingers, the action of locking or unlocking is simplified, in the same way as the prior action of engagement of the male cylindrical end in the female tubular cylindrical end.

Optionally, the recess with variable depth on the inner surface of the locking ring is hollowed in an ortho-radial angular sector, between a first angular end of maximum depth and a second angular end of minimum depth, with the depth progressively decreasing from said first angular end to said second angular end.

Also optionally, the recess has a maximum depth such that, when this maximum depth is arranged opposite the through-opening, the mobile locking element despite this protrudes inside the female tubular cylindrical end in such a way as to cooperate with the locking groove in order to exert the action of guiding and angularly limit the insertion of the male cylindrical end in the female tubular cylindrical end.

Also optionally, the locking groove has, at its end located opposite the free end of the male cylindrical end, a deeper cavity also hollowed in the outer surface of the male cylindrical end.

Also optionally, the mobile locking element is a ball.

Also optionally, the through-opening has a reduction in diameter, on the side of the inner surface of the female tubular cylindrical end, limiting the protruding of the mobile locking element inside the female tubular cylindrical end.

Also optionally, a locking system according to the invention can comprise an additional female tubular cylindrical end of the second element and an additional male cylindrical end of a third element, the second element forming as such an intermediary part for coupling the first element to the third element, the locking system then further having the following features:
- an additional locking groove is hollowed in the outer surface of the additional male cylindrical end of the third element,
- the additional female tubular cylindrical end is bored on the side with an additional through-opening inside of which is arranged an additional mobile locking element able to protrude inside the additional female tubular cylindrical end in the additional locking groove, and
- an additional locking ring is mounted to rotate freely around the additional female tubular cylindrical end opposite the additional through-opening, this additional locking ring having an inner surface wherein a recess having an ortho-radially variable depth enables the locking/unlocking of the additional mobile locking element against the additional locking groove according to the angular position of the additional locking ring about its axis of rotation.

Also optionally, the additional locking groove comprises at least one segment extending in the axial direction of the additional male cylindrical end from a free end thereof, in order to guide and angularly limit the insertion of the additional male cylindrical end in the additional female tubular cylindrical end, to a position of complete retraction of the second element in the third element wherein the female tubular cylindrical end of the second element does not exceed the free end of the additional male cylindrical end of the third element.

Also optionally, the additional locking groove comprises:
- a first segment extending in the axial direction of the additional male cylindrical end from a free end thereof, intended to extend the locking groove of the male cylindrical end of the first element,
- a second segment parallel to the first, extending axially from the free end of the additional male cylindrical end over a length that is greater than that of the first segment,
- a third segment, partially annular and orthogonal to the first two, connecting together, on the one hand, the end of the first segment which is opposite the free end of the additional male cylindrical end and, on the other hand, a median portion of the second segment,
- a fourth segment, partially annular, parallel to the third segment and of the same length as the latter, one end of this fourth segment communicating with the end of the second segment which is opposite the free end of the additional male cylindrical end, and
- a fifth segment parallel to the first two, extending over a certain length from the end of the fourth segment which is opposite that communicating with the second segment to the first segment and in the extension of the latter; and the distance between the third and fourth segments is equal to the distance between the through-opening and the additional through-opening.

Also optionally, the fifth segment has, at its end located opposite that communicating with the fourth segment, a cavity of a greater depth hollowed in the outer surface of the additional male cylindrical end, and the length of the fifth segment is equal to the sum of the length of the first segment and of the length of the locking groove of the male cylindrical end of the first element.

BRIEF DESCRIPTION OF THE DRAWINGS

The invention shall be better understood using the following description, provided solely by way of example and made in reference to the annexed drawings wherein.

DESCRIPTION OF PREFERRED EMBODIMENTS

Figure 1:
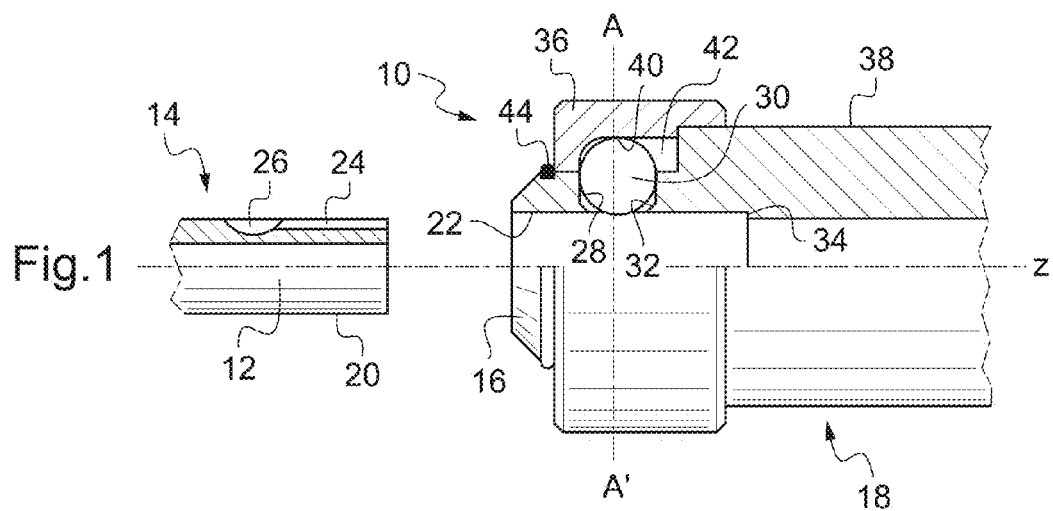
FIG. 1 is a longitudinal cross-section view of a locking system according to an embodiment of the invention.

The mechanical set shown in FIG. 1 has a locking system 10 comprising a male cylindrical end 12 of a first mechanical element 14 and a female tubular cylindrical end 16 of a second mechanical element 18, the male cylindrical end 12 being intended to be engaged inside the female tubular cylindrical end 16 for coupling the first mechanical element 14 to the second mechanical element 18.

The female cylindrical end 16 is necessarily hollow, therefore tubular, in order to receive the male cylindrical end 12, but more generally, the first and second mechanical elements 14, 18 can themselves be hollow over their entire length in such a way as to allow for the flow of a fluid such as water or other. Multiples applications can then be considered for the mechanical set, that latter able to comprise a tool and its tool holder, with or without transmission of fluid from the tool holder to the tool, two ducts or cables coupled together, etc.

The two cylindrical ends 12 and 16 are arranged coaxially in FIG. 1 along an axis z representing the common central axis of their cylindrical shapes. They are separated from each other but in coupling position by simple translation from one to the other along the axis z, the diameter of the outer surface 20 of the male cylindrical end 12 corresponding to that of the inner surface 22 of the female tubular cylindrical end 16.

The male cylindrical end 12 has a locking groove 24 hollowed in its outer surface 20 parallel to the axis z and over a portion of its length starting from its free end. This locking groove 24 is for example of semi-circular section and its end located opposite the free end of the male cylindrical end 12 has a partially spherical cavity 26 of a greater depth also hollowed in the outer surface 20.

The female tubular cylindrical end 16 is bored on the side with a through-opening 28 inside of which is arranged a mobile locking element 30 able to protrude inside the female tubular cylindrical end 16 in the locking groove 24 of the male cylindrical end 12 when the latter is engaged in the female tubular cylindrical end 16 according to a suitable ortho-radial angle. The shape of the mobile locking element 30 is relatively free, in particular able to be oblong, but it is advantageously spherical forming as such a ball able to slide or roll along the main axis of the through-opening 28. The latter is primarily cylindrical, but its end opening into the inner surface 22 of the female tubular cylindrical end 16 has a narrowing of the diameter materialized by a tapered portion 32. Advantageously, the diameter of the locking ball 30 corresponds to the largest diameter of the through-opening 28, in such a way that the tapered portion 32 limits the protruding of the locking ball 30 inside the female tubular cylindrical end 16 by preventing it from completely exiting the through-opening 28. The profile of the through-opening 28, cylindrical then tapered with a narrowing of the diameter at the internal end, is obtained very simply via an incomplete drilling that exits in the inner surface 22.

The inner surface 22 of the female tubular cylindrical end 16 can optionally comprise a shoulder 34 formed by a narrowing of its diameter. This shoulder 34 limits the insertion of the male cylindrical end 12. Advantageously, when the free end of the latter abuts against the shoulder 34, the cavity 26 is located opposite the through-opening 28, ready to receive the locking ball 30. As such, more preferably, the cavity 26 has a partially spherical shape corresponding to the spherical shape of the locking ball 30. In the absence of a shoulder 34, the cavity 26 can also alone fulfill the function of an abutment, because it is located at the end of travel of the locking ball 30 along the locking groove 24.

A locking ring 36 is mounted on the outer surface 38 of the female tubular cylindrical end 16 opposite the through-opening 28. This locking ring 36 has an inner surface 40 wherein a recess 42 with variable depth enables the locking/unlocking of the locking ball 30 against the locking groove 24, more precisely against the cavity 26 when the male cylindrical end 12 is completely engaged in the female tubular cylindrical end 16, depending on the position of the locking ring 36.

The locking ring 36 is mounted to rotate freely about the female tubular cylindrical end 16, but any translation along the axis z is prevented. This blocking in translation may be carried out in multiple manners known per se. In the embodiment shown concretely but not restrictively in FIG. 1, it is for example carried out, on the one hand by the presence of two shoulders, one on the outer surface 38 of the female tubular cylindrical end 16 and the other on the inner surface 40 of the locking ring 36, abutting against one another on one side of the ring, and on the other hand by the presence of an elastic ring or circlips 44 mounted in an annular groove hollowed in the vicinity of the free end of the female tubular cylindrical end 16, in its outer surface 38, on the other side of the locking ring 36.

The recess 42 is machined in the inner surface 40 of the locking ring in such a way as to have a variability in ortho-radial depth in relation to the reference axis z. As such, according to the ortho-radial angular position of the locking ring 36 around the female tubular cylindrical end 16, the locking ball 30 is more or less forced inwards protruding from the inner surface 22, according to the depth of the recess 42 in its angular portion arranged opposite the through-opening 28. In a first position of complete unblocking wherein the depth of the recess opposite the through-opening 28 is maximal, the locking ball 30 retains a certain degree of freedom in the through-opening 28 and does not exert any pressure against the locking groove 24 or against the cavity 26 when the male cylindrical end 12 is completed engaged. In this first position, the locking ball can despite this slightly protrude through the inner surface 22 of the female tubular cylindrical end 16 in such a way as to angularly guide the engagement in translation of the male cylindrical end 12 along the axis z thanks to the main axial direction of the locking groove 24. In a second position of complete blocking wherein the depth of the recess opposite the through-opening 28 is minimal, the locking ball 30 is forced towards the inside of the female tubular cylindrical end 16 and exerts maximum pressure against the locking groove 24 or against the cavity 26 when the male cylindrical end 12 is completed engaged, as such locking the coupling of the male cylindrical end 12 to the female tubular cylindrical end 16. Between these first and second positions, all of the positions with intermediate protruding of the locking ball 36 are for example possible according to the ortho-radial variations in the depth of the recess 42.

Then, when the mechanical element 14 is engaged in the mechanical element 18 along the axis z, the locking ring 36 remaining in its unblocking position, the locking groove 24 is used as an angular guide by cooperating with the slightly protruding locking ball 30. At the end of travel, the locking ball 30 is located opposite the cavity 26 and a simple rotation of the locking ring 36 to its blocking position using two fingers makes it possible to lock the coupling.

The locking groove 24 is shown as extending axially along the male cylindrical end 12, but in an alternative, it can be of annular shape around the male cylindrical end 12, at a distance such from its free end that it is opposite the through-opening 28 when the male cylindrical end 12 is completed engaged. This alternative embodiment is compatible with an application wherein the insertion of the male cylindrical end 12 in the female tubular cylindrical end 16 does not require being guided angularly.

Figure 2:
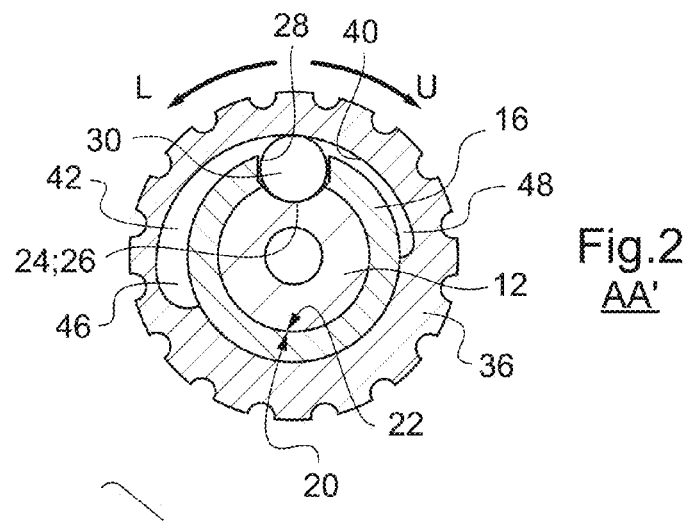
FIG. 2 is a radial cross-section view, according to a plane AA' shown in FIG. 1, of the locking system of FIG. 1.

As shown in FIG. 2 as a radial cross-section according to the plane AA' shown in FIG. 1, the recess 42 is for example hollowed in an ortho-radial angular sector limited about the axis z. At a first angular end 46, it has a maximum depth that decreases to a second angular end 48 wherein it has a minimum depth. For concerns of the facility of machining and of complementarity in shape with the locking ball 30, the two angular ends of the recess 42 can be rounded. Via rotation of the locking ring 36 about the axis z in a first direction U (for "Unlock"), the first angular end 46 is brought opposite the through-opening 28 and therefore the locking ball 30 in order to obtain the first aforementioned unblocking position wherein the coupling of the two mechanical elements 14 and 18 is unlocked. Via rotation of the locking ring 36 about the axis z in a second opposite direction L (for "Lock"), the second angular end 48 is brought opposite the through-opening 28 and therefore the locking ball 30 in order to obtain the second aforementioned blocking position wherein the coupling of the two mechanical elements 14 and 18 is locked. The system is shown in an intermediary position in FIG. 2.

Moreover, in order to facilitate the grasping of the locking ring 36 using two fingers of the same hand and its engagement in rotation about the axis z in the directions U or L, grooves parallel to the axis z can be arranged and distributed over the entire periphery of the locking ring 36. As an alternative (not shown), the outer surface of the locking ring 36 can be etched via knurling in order to be made anti-slip.

Figure 3:
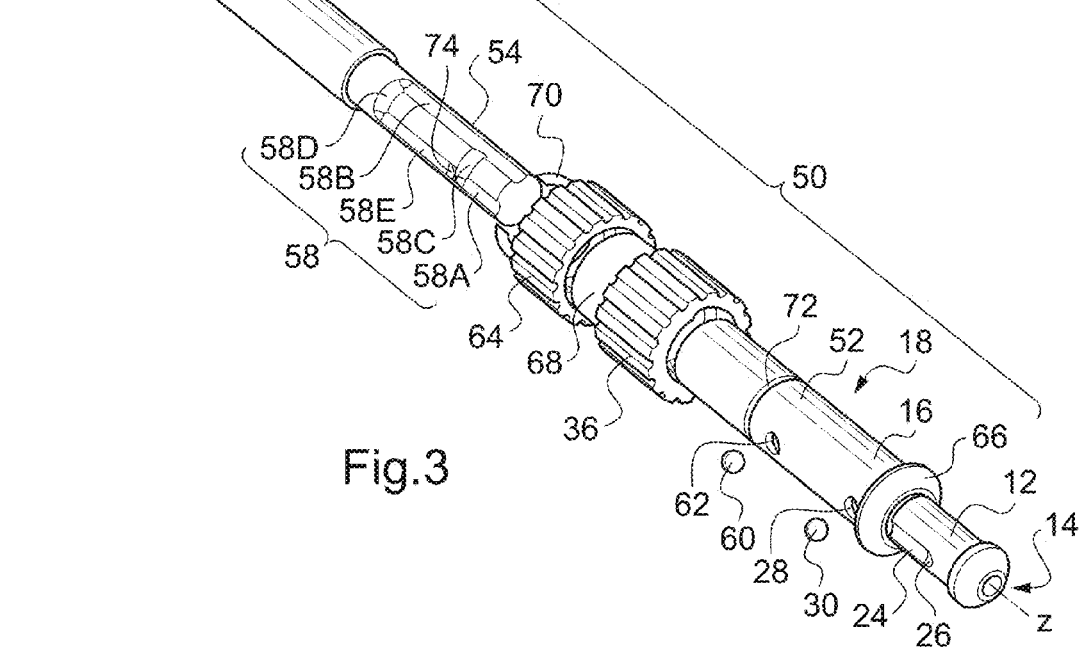
FIG. 3 is an exploded perspective view of a mechanical set that has a locking system according to another embodiment of the invention.

The mechanical set shown in FIG. 3 has a locking system 50 in accordance with an embodiment different from that shown in FIGS. 1 and 2. This embodiment is more complex but advantageous for certain applications relating to precision instrumentation wherein a tool must be coupled or detached with care from its tool holder.

According to this other embodiment, the mechanical set 50 comprises, as in the preceding embodiment, a male cylindrical end 12 of a first mechanical element 14, with the latter being for example a precision tool (partially shown in FIG. 3). It further comprises, as in the preceding embodiment, a female tubular cylindrical end 16 of a second mechanical element 18, the male cylindrical end 12 being intended to be engaged inside the female tubular cylindrical end 16 in order to couple the first mechanical element 14 to the second mechanical element 18, with the latter being a tubular intermediary part for coupling.

In addition to the preceding embodiment, the mechanical set 50 comprises an additional female tubular cylindrical end 52 of the tubular intermediary part for coupling 18 and an additional male cylindrical end 54 of a third mechanical element 56, with the latter being for example a tool holder (partially shown in FIG. 3). The additional male cylindrical end 54 is intended to be engaged inside the additional female tubular cylindrical end 52 for coupling the tool holder 56 to the tubular intermediary part for coupling 18. The latter as such fulfills a coupling function of the tool 14 to its tool holder 56.

As in the preceding embodiment, the locking groove 24 hollowed longitudinally in the male cylindrical end 12 of the tool 14 cooperates with the locking ball 30, the through-opening 28 hollowed in the female tubular cylindrical end 16 of the tubular intermediary part for coupling 18 and the locking ring 36 arranged around the female tubular cylindrical end 16 of the tubular intermediary part for coupling 18 opposite the through-opening 28, to couple the tool 14 to the tubular intermediary part for coupling 18 and locking or unlocking this coupling as detailed hereinabove.

Furthermore, an additional locking groove 58 is hollowed in the outer surface of the additional male cylindrical end 54 and cooperates with an additional locking ball 60, an additional through-opening 62 hollowed in the additional female tubular cylindrical end 52 of the tubular intermediary part for coupling 18 and an additional locking ring 64 arranged around the tubular intermediary part for coupling 18 opposite the additional through-opening 62, in order to couple the tool holder 56 to the tubular intermediary part for coupling 18 and lock or unlock this coupling, according to a similar principle, although more complex, to that detailed hereinabove.

The additional locking ring 64 has the same technical features as the locking ring 36. In other terms, it also has an inner surface wherein a recess with variable depth enables the locking/unlocking of the additional locking ball 60 against the additional locking groove 58 according to its position. More precisely, it is mounted to rotate freely about the tubular intermediary part for coupling 18 and the variability of the depth of the recess that enables the locking/unlocking of the additional locking ball 60 is ortho-radial.

The two locking rings 36 and 64 are moreover immobilized in translation along the main axis z of locking system 50. This immobilization in translation can be carried out in multiples ways known per se. In the non-restricted embodiment concretely shown in FIG. 3, it is for example carried out using a collar 66 formed at the end of the tubular intermediary part for coupling 18 located on the side of the tool 14, a ring 68 forming a spacer arranged between the two locking rings 36 and 64, and an elastic ring or circlips 70 mounted in an annular groove 72 hollowed in the vicinity of the end of the tubular intermediary part for coupling 18 located on the side of the tool holder 56.

The additional locking groove 58 is of a shape that is more complex than the locking groove 24.

It has a first segment 58A extending axially, i.e. along the main axis z, from the free end of the additional male cylindrical end 54 over a certain length LA. This first segment 58A is intended to extend the locking groove 24, of length L, when the tool 14 and the tool holder 56 are engaged against one another in the tubular intermediary part for coupling 18. It therefore has the same characteristics of section.

It has a second segment 58B parallel to the first, extending axially from the free end of the additional male cylindrical end 54 over a certain length LB that is clearly greater than LA.

It has a third segment 58C, partially annular and orthogonal to the first two, connecting together, on the one hand, the end of the first segment 58A which is opposite the free end of the additional male cylindrical end 54 and, on the other hand, a median portion of the second segment 58B.

It has a fourth segment 58D, partially annular, parallel to the third segment 58C and of the same length as the latter. One end of this fourth segment 58D communicates with the end of the second segment 58B which is opposite the free end of the additional male cylindrical end 54.

Finally, it has a fifth segment 58E parallel to the first two, extending over a certain length LE from the end of the fourth segment 58D which is opposite that communicating with the second segment 58B to the first segment 58A and in the extension of the latter.

So that the fifth segment 58E does not entirely join the first segment 58A, it is necessary that the length LB satisfy the condition LB>LE+LA.

Moreover, the length LE satisfies the relationship LE=L+LA and an additional cavity 74 of partially spherical shape, identical to the cavity 26, is hollowed at the end of the fifth segment 58E which is close to the first segment 58A. This cavity 74 is used, as the cavity 26 for the locking ball 30, as an abutment for the end of travel for the additional locking ball 60. Finally, the distance between the cavities 26 and 74, when the tool 14 and the tool holder 56 are arranged against each other coaxially along the axis z by their respective male ends 12, 54 and when the locking groove 24 is arranged facing the first segment 58A of the additional locking groove 58, is precisely equal to the distance between the two through-openings 28 and 62 drilled in the tubular intermediary part for coupling 18, which is itself precisely equal to LB-LA (i.e. The distance between the third and fourth segments 58C and 58D).

As such, when the tool holder 56 is engaged in the tubular intermediary part for coupling 18 along the axis z, the additional locking ring 64 remaining in its unblocking position, the second segment 58B (or possibly the first segment 58A, then the third segment 58C, then the portion of the second segment 58B extending beyond the third segment 58C in the additional male cylindrical end 54) is used as an angular guide thanks to the cooperation of the additional locking groove 58 with the additional locking ball 60.

In light of the configuration for which details were provided hereinabove, the aforementioned engagement of the additional locking ball 60 in the additional locking groove 58 also drives the engagement of the locking ball 30 in the additional locking groove 58. In light furthermore of the distance LB-LA between the locking balls 30, 60 when they are housed in their respective through-openings 28, 62, the locking ball 30 reaches the third segment 58C when the additional locking ball 60 reaches the fourth segment 58D.

In this position, by guiding a rotation of the tubular intermediary part for coupling 18 about the axis z in the correct direction, the additional locking ball 60 is guided along the fourth segment 58D to the fifth segment 58E and the locking ball 30 along the third segment 58C to the first segment 58A.

Finally, starting from this new position, by guiding a translation of the tubular intermediary part for coupling 18 along the axis z in the correct direction, the additional locking ball 60 is guided along the fifth segment 58E to the additional cavity 74 and the locking ball 30 along the first segment 58A towards the exterior of the additional male cylindrical end 54 at the distance L from its end (since LE=L+LA). In this final position, a rotation of the additional locking ring 64 about the axis z to its blocking position makes it possible to lock the coupling of the tubular intermediary part for coupling 18 to the tool holder 56. Optionally, a sufficient depth of the segments 58B, 58C and 58D can be provided, in particular greater than that of the segments 58A, 58E and of the locking groove 24, so that the engagement of the locking balls 30 and 60 in these segments 58B, 58C and 58D is possible regardless of the ortho-radial position of the additional locking ring 64. This makes it possible to facilitate the coupling manipulation.

In the final locked position of the tubular intermediary part for coupling 18 around the additional male cylindrical end 54, a configuration is found similar to that of FIG. 1 for the insertion of the tool 14 in the set constituted of the tool holder 56 and of the tubular intermediary part for coupling 18. The free end of the additional male cylindrical end 54 engaged in the tubular intermediary part for coupling 18 then fulfills the function of the shoulder 34.

It is therefore sufficient to engage the male cylindrical end 12 of the tool 14 in the female tubular cylindrical end 16 of the tubular intermediary part for coupling 18 against the tool holder 56, by being guided by the cooperation between the locking groove 24 and the locking ball 30 and by maintaining the locking ring 36 in unblocking position, in order to bring the locking ball 30 opposite the cavity 26. In this position, a rotation of the locking ring 36 about the axis z to its blocking position makes it possible to lock the coupling of the tool 14 to the set comprised of the tubular intermediary part for coupling 18 and of the tool holder 56.

The interest of the embodiment of FIG. 3 appears especially when it is desired to release the tool holder 56 from its tools 14 since it makes it possible to proceed according to two separate methods.

According to a first method, the tool is disengaged as in the embodiment of FIG. 1. Via ortho-radial rotation of the locking ring 36 to its unblocking position, the tool 14 is released which can then be extracted from the tubular intermediary part for coupling 18 by translation along the axis z by separating it from the tool holder 56.

According to a second method, via ortho-radial rotation of the locking ring 36 to its unblocking position, the tool 14 is released but it is maintained in position in the tubular intermediary part for coupling 18. Then via ortho-radial rotation of the additional locking ring 64 to its unlocking position, the tubular intermediary part for coupling 18 along the additional male cylindrical end 54 is released. The latter can then be retracted over the entire length of the fifth segment 58E in the tool holder 56. It is sufficient to provide a length LE that is sufficient so that in retracted position the tubular intermediary part for coupling 18 does not exceed the free end of the additional male cylindrical end 54. It is then possible to remove the tool 14 on the side, without any translation along the axis z. This second method therefore makes it possible to detach the tool holder 56 and its tool 14 without any relative axial separation of the two parts. This is particularly advantageous in applications of precision tools wherein no axial space is sufficient to disengage the tool from its tool holder axially.

Another interest of the embodiment of FIG. 3 relates to certain applications wherein the manipulations are subjected to strict rules of hygiene, since the tubular intermediary part for coupling 18 can be designed as a part that is disposable or that can be sterilized independently from the two others.

Note moreover that the particular configuration in segments connected together of the embodiment of FIG. 3, thanks to which the engagement of the two locking balls 30 and 60 of the locking system can be coordinated and thanks to which also the tubular intermediary part for coupling 18 can be entirely retracted in the additional male cylindrical end 54 for an effective removal of the tool 14, is finally independent of the locking system chosen. Indeed, it is sufficient that a locking element (ball or other) of the locking system be guided in a groove, so that regardless of the locking system chosen, this configuration produces the technical effect for which the details were provided hereinabove.

It clearly appears that a locking system such as one of those described hereinabove allows for a positioning and an easy locking of two elements to be coupled when these two elements are designed on the principle of a male end cooperating with a female end. The locking operation is possible using two fingers of a single hand. Furthermore, the unlocking and the detaching of the two elements are also particularly simple to execute. In the case of the second embodiment for which details were provided hereinabove and relating to the locking/unlocking of a tool on its tool holder, this operation can then be carried out without relative axial displacement of the tool holder and of the tool.

Note that all types of materials, metals, plastics or other, can be considered, according to the applications sought and the contexts involved, to manufacture the various elements described hereinabove.

Note moreover that the invention is not limited to the embodiments described hereinabove.

In particular, several through-openings and several mobile locking elements can be distributed angularly around the female tubular cylindrical end involved.

In particular also, the locking groove or grooves can have varied shapes according to the guiding desired in order to carry out the coupling before locking.

It will appear more generally to those skilled in the art that various modifications can be made to the embodiments described hereinabove, in light of the information that has just been disclosed. In the claims that follow, the terms used must not be interpreted as limiting the claims to the embodiments exposed in this description, but must be interpreted in order to include therein all of the equivalents that the claims aim to cover due to their formulation and the foreseeing of which is within the scope of those skilled in the art by applying their general knowledge to the implementation of the information that has just been disclosed.

The invention claimed is:

1. A locking system comprising:
    a male cylindrical end of a first element and a female tubular cylindrical end of a second element, the male cylindrical end being engaged inside the female tubular cylindrical end to couple the first element to the second element,
    wherein:
    a locking groove is hollowed in an outer surface of the male cylindrical end,
    the female tubular cylindrical end is bored on a side with a through-opening inside of which is arranged a mobile locking element that protrudes from inside the female tubular cylindrical end and into the locking groove of the male cylindrical end, and a locking ring is mounted, free in rotation around the female tubular cylindrical end, on an outer surface of the female tubular cylindrical end opposite the through-opening, the locking ring having an inner surface with a recess having an ortho-radially variable depth that enables locking/unlocking of the mobile locking element against the locking groove depending on a position of the locking ring, wherein the locking groove extends in an axial direction of the male cylindrical end from an axial free end thereof, and wherein the mobile locking element is moves within the locking groove from the axial free end in order to guide and angularly limit the insertion of the male cylindrical end in the female tubular cylindrical end.

2. The locking system according to claim 1, wherein the recess with variable depth on the inner surface of the locking ring is hollowed in an ortho-radial angular sector, between a first angular end of maximum depth and a second angular end of minimum depth, the depth decreasing progressively from said first angular end to said second angular end.

3. The locking system according to claim 1, wherein the recess has a maximum depth such that, even when this maximum depth is arranged opposite the through-opening inside of which is arranged the mobile locking element, the mobile locking element still protrudes from inside the female tubular cylindrical end and into the locking groove of the male cylindrical end in order to guide and angularly limit the insertion of the male cylindrical end in the female tubular cylindrical end.

4. The locking system according to claim 1, further comprising a cavity in the outer surface of the male cylindrical end at a distal end of the locking groove opposite the free end of the male cylindrical end, the cavity having a greater depth than the locking groove and being adapted to receive the mobile locking element.

5. The locking system according to claim 1, wherein the mobile locking element is a sphere.

6. The locking system according to claim 1, wherein the through-opening has a reduction in diameter, on the side of the inner surface of the female tubular cylindrical end, limiting the protruding of the mobile locking element inside the female tubular cylindrical end.

7. The locking system according to claim 1, comprising an additional female tubular cylindrical end of the second element and an additional male cylindrical end of a third element, the second element forming as such an intermediary part for coupling the first element to the third element, wherein:

an additional locking groove is hollowed in the outer surface of the additional male cylindrical end of the third element, the additional female tubular cylindrical end is bored on the side with an additional through-opening inside of which is arranged an additional mobile locking element able to protrude inside the additional female tubular cylindrical end in the additional locking groove, and an additional locking ring is mounted to rotate freely around the additional female tubular cylindrical end opposite the additional through-opening, this additional locking ring having an inner surface wherein a recess having an ortho-radially variable depth enables the locking/unlocking of the additional mobile locking element against the additional locking groove according to the angular position of the additional locking ring about its axis of rotation.

8. The locking system according to claim 7, wherein the additional locking groove comprises at least one segment extending in the axial direction of the additional male cylindrical end from a free end thereof, in order to guide and angularly limit the insertion of the additional male cylindrical end in the additional female tubular cylindrical end.

9. The locking system according to claim 8, wherein the additional locking groove comprises:

a first segment extending in the axial direction of the additional male cylindrical end from a free end thereof, intended to align and abut with the locking groove of the male cylindrical end of the first element to create an adjoining groove, a second segment parallel to the first segment, extending axially from the free end of the additional male cylindrical end over a length that is greater than that of the first segment, a third segment, partially annular and orthogonal to the first and second segments, connecting together the end of the first segment which is opposite the free end of the additional male cylindrical end and a median portion of the second segment, a fourth segment, partially annular, parallel to the third segment and of the same length as the third segment, one end of this fourth segment communicating with the end of the second segment which is opposite the free end of the additional male cylindrical end, and a fifth segment parallel to the first and second segments, extending over a certain length from the end of the fourth segment which is opposite that communicating with the second segment to the first segment and in the extension of the first segment; and wherein the distance between the third and fourth segments is equal to the distance between the through-opening and the additional through-opening.

10. The locking system according to claim 9, wherein the fifth segment has, at its end located opposite that communicating with the fourth segment, a cavity of greater depth hollowed in the outer surface of the additional male cylindrical end, and wherein the length of the fifth segment is equal to the sum of the length of the first segment and of the length of the locking groove of the male cylindrical end of the first element.

11. A locking system comprising:

a male cylindrical end of a first element and a female tubular cylindrical end of a second element, the male cylindrical end being engaged inside the female tubular cylindrical end to couple the first element to the second element;

a locking groove in an outer surface of the male cylindrical end and extending in an axial direction of the male cylindrical end from an axial free end thereof;

a through-opening in a side of the female tubular cylindrical end;

a spherical locking element protruding from the through-opening in the female tubular cylindrical end and, selectively, into the locking groove of the male cylindrical end, wherein when the spherical locking element moves within the locking groove from the axial free end, the spherical locking element axially guides and angularly limits insertion of the male cylindrical end in the female tubular cylindrical end; and a locking ring mounted, free in rotation, around an outer surface of the female tubular cylindrical end opposite the through-opening, the locking ring having an inner surface with a recess having an ortho-radially variable depth that selectively moves the spherical locking element into the locking groove depending on the position of the locking ring.

12. The locking system of claim 11, further comprising a cavity in the outer surface of the male cylindrical end at a distal axial end of the locking groove opposite the free end, the cavity being deeper than the locking groove and adapted to receive the spherical locking element.

* * * * *